Figure 1:
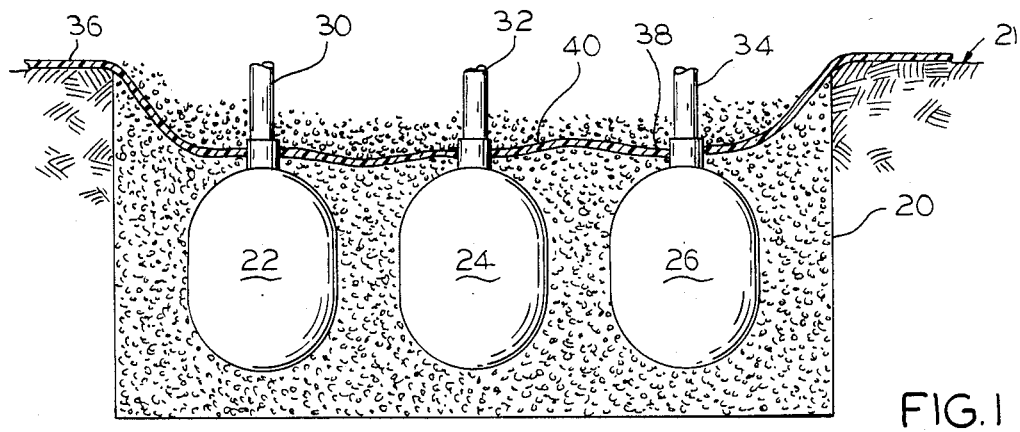

United States Patent [19]

Flessas

[11] Patent Number: 4,802,792
[45] Date of Patent: Feb. 7, 1989

[54] BUSHINGS FOR JOINING RIGID OBJECTS TO FLEXIBLE MEMBRANES

[75] Inventor: James D. Flessas, Hinsdale, Ill.

[73] Assignee: MPC Industries, Inc., Chicago, Ill.

[21] Appl. No.: 920,717

[22] Filed: Oct. 17, 1986

[51] Int. Cl.$^4$ ............................................. F16L 19/00
[52] U.S. Cl. ...................................... 405/53; 285/161; 285/200; 405/52; 405/303
[58] Field of Search ............................ 405/128, 53, 52; 285/161, 191, 200

[56] References Cited

U.S. PATENT DOCUMENTS

| | | | |
|---|---|---|---|
| 499,956 | 6/1893 | Berry | 285/200 X |
| 1,574,690 | 2/1926 | Radabaugh | 285/200 X |
| 1,620,415 | 3/1927 | Van Orman | 285/200 |
| 2,344,056 | 3/1944 | Pepersack | 285/200 X |
| 2,482,469 | 9/1949 | Crowley | 285/200 |
| 2,500,531 | 3/1950 | Eger | 285/200 X |
| 2,652,858 | 9/1953 | Snyder | 285/200 X |
| 3,181,899 | 5/1965 | McKnight | 285/161 |
| 3,401,958 | 9/1968 | Demyon | 285/161 X |
| 3,703,302 | 11/1972 | Demler | 285/161 |
| 3,749,424 | 7/1973 | Greene | 285/161 |

Primary Examiner—Dennis L. Taylor
Attorney, Agent, or Firm—Laff, Whitesel, Conte & Saret

[57] ABSTRACT

A membrane provides a secondary containment system for a fuel storage system. The membrane is stressed by the heaving and sinking of the earth supporting the membrane. A pipe passes through and is bonded to the membrane. A bushing absorbs and distributes the stresses within the membrane to protect the bond between the pipe and the membrane.

7 Claims, 1 Drawing Sheet

U.S. Patent

Feb. 7, 1989

4,802,792

BUSHINGS FOR JOINING RIGID OBJECTS TO FLEXIBLE MEMBRANES

This invention relates to bushing means for and methods of joining rigid objects to flexible membranes and more particularly to joining it to a rigid metal pipe extending through in a hole in the flexible membrane which is used as an underground secondary containment system.

Reference is made to co-pending U.S. patent application Ser. No. 709,597 filed Mar. 8, 1985, which shows a membrane that may use the invention.

A recent trend has been to provide means for preventing underground pollution which might result in a contamination of the underground water supply. Exemplary of the source of such pollution problems is an underground fuel storage tank which may leak, over flow, be carelessly filled, or the like. A result of these and similar events is the escape of fluid from the tank and into the surrounding earth. To prevent a general wide area contamination, a membrane may be spread under or over the fuel storage tank in order to catch the escaping fluid.

This structure introduces a problem since the membrane must be spread in an area where the escaping fluid must accumulate and, therefore, must be contained. That same area may also be one where a rigid device must pass through the membrane and into this fuel tank. For example, a fuel tank buried under the ground must have a fill pipe that extends to a location where fuel may be pumped into the tank. If the person who is pumping the fuel is careless, or if there is an accident, some amount of fuel may be pumped or spilled onto the ground and not into the tank. Therefore, a membrane must surround the fill pipe to catch the spillage.

It is easy to form a hole in the membrane and to extend the fill pipe through the hole. Initially, it is also easy to bond or otherwise secure the membrane to the periphery of the pipe so that there is no leakage at the juncture between the pipe and membrane. However, such an installation remains in place for many years and, therefore, is subject to both predictable and unforeseen events. For example, freezing and thawing, raising and lowering of the underground water table, sudden storms, and prolonged droughts are predictable events which cause the earth to heave and sink as well as to dry, crack or become water logged. There are also the unforeseen events which may be caused by man, such as heavy machinery bearing down upon the surface of the earth over the membrane, near by excavation, pumping out underground water, and the like.

As a result of these and other events, the membrane is subjected to many stresses and strains, as it is pulled and released by forces unleashed by these and other events. This action may break the bond between the pipe and membranes. Thus, the problems relating to joining or bonding a pipe and a membrane—especially a pipe passing through a hole in a membrane which forms a basin—are not simple and are not easy to solve.

Accordingly, an object of the invention is to provide new and improved means for and methods of joining membranes to rigid objects. Here, an object is to provide means for enabling rigid conduits and similar objects to pass through a hole in and to be sealed to the membrane. In particular, an object is to protect the juncture between the conduit and the membrane and to prevent it from being ruptured by the heaving and sinking of the underlying surface which supports the membrane.

Another object of the invention is to provide hardware fittings for underground secondary containment systems for fuel tanks. Here, an object is to provide means for enabling fill pipes to pass through secondary containment membranes, especially membranes which may form a basin for collecting fluids.

In keeping with these and other objects of the invention, a bushing having a rigid fitting may be inserted into the fill pipe at the level where the pipe passes through a membrane. The fitting provides means for supporting and clamping a pair of semi-flexible washers, one being located on each of the opposite sides of a membrane which is used to provide a secondary liner. As the membrane is stressed, the semi-flexible washers are flexed to absorb and distribute those stresses over a relatively wide area, while relieving the stresses acting between the membrane and fill pipe. This way, the bushing protects a bond at the junction between the membrane and fill pipe.

Figure 2:
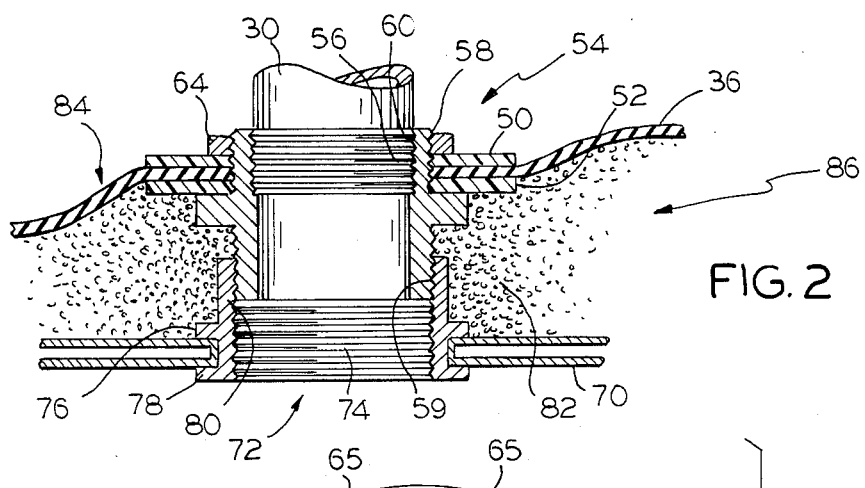
Figure 3:
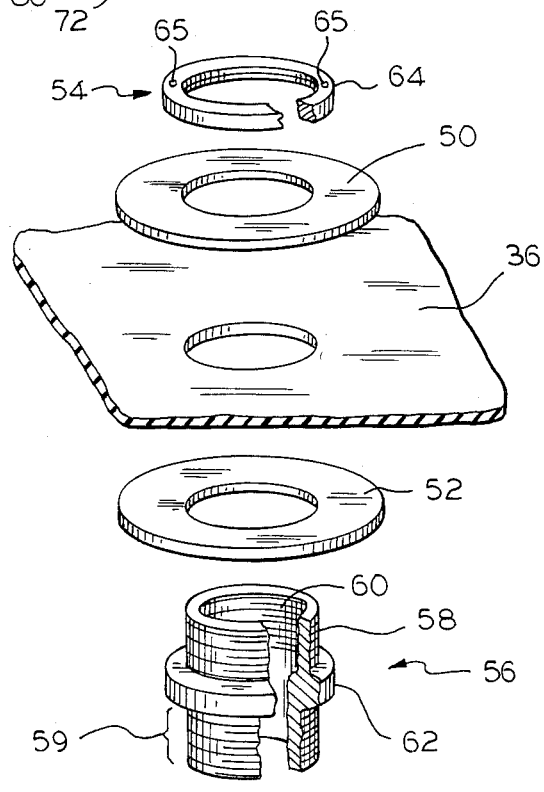

A preferred embodiment of the invention is shown in the attached drawings wherein:

FIG. 1 schematically shows an exemplary three fuel tanks covered by a tank pit liner membrane with the inventive interface bushing at the junction between the fill pipe and the membrane;

FIG. 2 is an enlarged cross-section of the inventive bushing, in place on a double wall tank by way of example; and FIG. 3 is an exploded view of the inventive bushing and a fragment of the membrane.

In FIG. 1, a hole or pit 20 has been dug or otherwise formed in the earth 21 to receive any suitable number (here three) of underground storage tanks 22, 24, 26. One or more entrance or fill pipes are attached to these tanks, here shown as fill pipes 30, 32, 34. Of course, pipes are only one example. Any other suitable rigid devices may also pass through the membrane. The rest of the pit 20 is filled with pebbles and sand, call "ballast."

These tanks may leak, or there could be a spill of fluid at the surface, as during the filling of the tank, for example. At one time, such spills were ignored. However, this indifference to such spilling has led to serious environmental pollution problems which are no longer tolerated. Beyond this, the pollution could endanger the underground water supply.

One way to guard against these pollution problems is to place a membrane 36 made of industrial fabric over the tanks and through the ballast so that a basin is formed to collect any fluids which may be spilled. For example, during the filling of the tanks, fluid might gush back up the fill pipes 30, 32, 34; or, a careless worker might begin pumping fluid when a hose is not properly secured to the fill pipes. Regardless of the reason why a spill might occur, the escaping fluid is captured within a basin formed by the membrane 36.

Therefore, it is apparent that the membrane 36 must be sealed around the outside periphery of the fill pipes, 30, 32, 34. Otherwise, any spillage which is collected in the membrane 36 may seep through the unsealed space between the fill pipe and the membrane in violation of both good sense and the environmental laws. If the membrane to pipe seal is made in an obvious manner as by cement or a metal-to-metal clamp, the resulting junction is likely to break, tear, or otherwise be destroyed by naturally occurring events. For example, as shown at 38

(FIG. 1), the ballast has sunk, dragging down the membrane 36, while the ballast has heaved at 40 pushing up the membrane, thereby placing severe stress upon both the membrane-to-pipe seal and the fabric which forms the membrane. If the membrane stretches over a sharp edge, such as hardware (nuts, bolts, plates) used to seal the membrane to the pipes, that sharp edge will likely cut or tear the membrane. If the membrane is bonded to the pipe, by an adhesive or glue, the joint will likely be pulled apart and destroyed by the stresses within the membrane.

According to the invention, a pair of relatively semi-flexible washers 50, 52 (FIG. 2) are placed on opposite sides of the membrane 36. The fill pipe 30 passes through aligned holes of the same size which are formed in the washers and membrane. By way of example, each washer may be made of a relatively hard nylon sheet with approximately eight inches in diameter and a sixteenth of an inch thick, when the diameter of the fill pipe is in the order of four inches.

The inventive bushing 54 (FIG. 3) comprises a first metal tubular member 56 with outside diameter threads at 58, 59 and inside diameter threads at 60. An enlarged collar 62 is formed below threads 58, 60 and above threads 59 in order to form a seat for supporting the semiflexible washers 50, 52. A fill pipe (such as 30) may be threaded into the inside threads 60. The outside threads 50 may be used to attach member 56 to any suitable device. The metal fitting is completed by an internally threaded nut 64 which fits over and mates with the outside threads 58. Diametrically opposed counter sunk holes 65, 65 receive a wrench that may be used to tighten the nut against the collar 62.

Thus, to use the fitting 54, it is first attached to a fuel tank or the like, by means of threads 59. Then, holes in the semi-flexible discs 50, 52 are placed on opposite sides of the hole in membrane 36 and the aligned holes are placed over threads 58 on the end of fitting 56, coming to rest on top of the collar 62. Next, the nut 64 is threaded onto external threads 58 and tightened by a wrench fitting into holes 65, 65 to hold together the assembly. In the area where the nut 64 seats on the collar 62, the assembly is tightly clamped. At the outer periphery of the washers 50, 52, the assembly is free to flex.

The inventive bushings may be used on any suitable device which is here illustrated, by way of example, as a double walled fuel tank 70 (FIG. 2) having an entrance port 72 formed therein. An attachement member 74, of any suitable design, is mounted in port 72 to receive threads 59. As here shown, fitting 74 has upper and lower flanges 76, 78 which abut against opposite sides of the tank. These flanges may be parts that are bolted together, swaged into a press fit, or the like. The seal between the attachment member 74 and tank 70 may be made in any suitable way, such as bonding cement, gaskets, or the like. The attachment member has an upper threaded section 80 which mate with threads 59 (FIG. 3) on the fitting 56. Of course, this is only an example. Any suitable device may be attached to the threads 59.

The ballast 82 may move in any random and unpredictable manner, as illustrated in FIG. 1. Thus, FIG. 2 is drawn to show that th ballast has sunk in the area 84 and heaved in the area 86. The mechanical strength of the two semi-flexible washers 50, 52 have distributed the resulting stress over a substantial area of the membrane. In the immediate vicinity of the hole through the membrane 36, the nut 64 and collar 62 tightly clamp it between the washers 50, 52 so that the bond between the fill pipe and membrane is protected.

Those who are skilled in the art will readily perceive how to modify the inventive system. Therefore, the appended claims are to be construed to cover all equivalent structures which fall within the true scope and spirit of the invention.

The claimed invention is:

1. A bushing for enabling a rigid object to make a sealed penetration of a hole having a first diameter and formed in a membrane of industrial fabric which may be buried in the earth and which is subject to bending forces, said bushing comprising a tubular member having an enlarged collar which has a diameter that is greater than said first diameter, external threads extending from at least one side of said collar to an end of said member, a pair of smooth surfaced semi-flexible washers having center holes with substantially said first diameter, said washers being positioned on opposite sides of said membrane with said holes aligned and fitting over said external threads, said washers resting on said enlarged collar without being attached to said membrane in order to distribute said bending forces appearing in the membrane while enabling the membrane to slip relative to said washer in the general areas where said bending forces appear whereby said membrane does not always tend to bend at the same location, and nut means cooperating with said collar for tightly securing said washers on opposite sides of said membrane.

2. The bushing of claim 1 wherein said washers have an outside diameter which is approximately twice the first diameter of said holes.

3. The bushing of claim 1 wherein said membrane is a secondary containment for a fuel tank.

4. The bushing of claim 3 and attachment means sealed to said full tank at an entrance thereto, said tubular member being sealed to said attachment means.

5. A secondary containment system for a pit containing at least fuel tanks, a membrane spread in said pit to collect escaping fuel, said pit being filled with ballast after said membrane is spread whereby said membrane is buried, a rigid object of a first diameter passing through an aperture formed in said membrane and having a first diameter, a tubular member having a collar with a diameter that is larger than said aperture, said tubular member also having a threaded outside diameter substantially corresponding to said first diameter of said aperture, a pair of semi-flexible washers having center holes with a size corresponding to the size of said aperture, one of said washers being located on but not attached to each of the opposite sides of said membrane with the center holes of said washer substantially aligned with said aperture, said washers and membrane being mounted on the threaded outside diameter in confrontation with said large diameter collar, and means comprising a threaded nut fitting over said threaded outside diameter for tightly clamping said washers in place on opposite sides of said membrane, said membrane being able to slip relative to said washers when said membrane bends outside the tightly clamped area.

6. A bushing for enabling a rigid object to make a sealed penetration through a hole having a first shape and area formed in a membrane of industrial fabric which is subject to substantial flexing during normal use, said bushing comprising a tubular member having an enlarged collar which has a shape and area that is greater than said first shape and area, external threads extending from at least one side of said collar to an end of said member, a pair of semi-flexible washers having center holes with said substantially the first shape and area, said washers being positioned without bonding on opposite sides of said membrane with said holes substantially aligned and fitting over said external threads and resting on said enlarged collar for distributing forces generated by said normal flexing over a substantial area which is covered by said washer whereby said flexing does not always cause said membrane to bend at the same location, and nut means cooperating with said collar for tightly securing said washers on opposite sides of said membrane.

7. A bushing for enabling a rigid object to make a sealed penetration through a hole having a first shape and area formed in a membrane of industrial fabric, said membrane being part of a secondary containment for a fuel tank, said secondary containment system comprising a pit containing fuel tanks, said membrane being spread in said pit to collect escaping fuel, a rigid object of said first shape and area passing through said hole formed in said membrane, said bushing comprising a tubular member having an enlarged collar which has a shape and area that is larger than said first shape and area of said hole, said tubular member also having a threaded outside shape corresponding to the shape of said hole, said external threads extending from at least one side of said collar to an end of said member, a pair of semi-flexible washers having center holes corresponding to the shape and area of said hole, one of said washers being located on each of the opposite sides of said membrane with their center holes aligned with said hole in said membrane, said washers and membrane being mounted on the outside of the threaded tubular member in confrontation with said large shape and area collar, and means comprising a threaded nut fitting over said threaded outside shape and area for tightly clamping said washers in place on opposite sides of said membrane.

* * * * *